2,961,293
Patented Nov. 22, 1960

2,961,293
PURIFICATION OF HAFNIUM TETRAHALIDE

Ivan Edgar Newnham, North Balwyn, Victoria, Australia, assignor, by mesne assignments, to Mallory-Sharon Metals Corporation, a corporation of Delaware No Drawing. Filed Feb. 19, 1957, Ser. No. 641,029

7 Claims. (Cl. 23—16)

This invention relates to a new and improved method for the purification of hafnium tetrahalides. More specifically, the invention pertains to a process whereby concentrated and purified hafnium tetrahalide fractions are derived from mixed metal ores or metal halide mixtures having a low hafnium concentration.

This application is a continuation-in-part of Serial No. 360,320, filed on June 8, 1953, now U.S. Patent No. 2,791,485.

Normally hafnium occurs in nature in small amounts associated with zirconium in most zirconium minerals. Zircon and baddeleyite, the commercial zirconium minerals, contain 0.05 to 2.0 and 1.0 to 1.8 percent hafnium oxide, respectively. Altered zircons of granitic origin have the highest hafnium oxide concentrations. For example, cyrtolite contains about 5.5 to 17.0 percent hafnium oxide. The first step in the recovery of hafnium is the decomposition of the zirconium minerals. Utilizing zircon as an example, the conventional method of decomposition comprises the formation of zirconium carbide by the reaction of zircon and carbon in an arc furnace. The resulting carbide is then subjected to halogenation to prepare hafnium and zirconium tetrahalides. The main problem in the recovery of pure hafnium compounds is the separation from zirconium. Since zirconium and hafnium have very similar chemical properties, the separation has been very difficult. Proposed processes have included fractional distillation, fractional precipitation, fractional crystallization and ion-exchange. Though some degree of separation can be accomplished by these processes, they are not without serious disadvantages. Furthermore, these processes are not particularly adaptable for large scale continuous operations, which would be required of a commercial separation process. In U.S. Patent No. 2,744,060 separation of hafnium and zirconium halides was proposed by subjecting the mixed metal halide feed to contact with a countercurrently flowing, molten alkali metal chloride salt, such as sodium chloride, in a fractionation zone. A hafnium-rich product is removed from the upper portion of said zone, and a zirconium-rich product from the lower portion of the fractionation zone. In a specific example set forth in this patent, the hafnium oxide content of the feed, 2.4%, was increased in the hafnium-rich product to 4.4%.

It is one object of the invention to provide an effective and commercially adaptable process for the separation of hafnium from zirconium which avoids the difficulties of the prior art processes. Another object of this invention is the recovery of hafnium-rich products which have a high hafnium content as compared to the prior art processes. Other objects of the invention will become apparent from the ensuing description.

In accordance with the present invention, it has been found that a purified and comparatively rich hafnium tetrahalide product can be obtained directly from a mixed hafnium and zirconium tetrahalide feed by selectively reducing the zirconium tetrahalide to a relatively involatile form. The invention is based on the discovery of a marked difference in the chemical reducibility of hafnium and zirconium tetrahalides. In general, the inventive process comprises recovering the hafnium from the zirconium-containing material by converting the zirconium and hafnium constituents into tetrahalides by any known procedure, and then preferentially reducing the zirconium tetrahalide to one or more lower halides or even to metallic zirconium. The hafnium tetrahalide remains substantially unchanged during the reduction, and it may be recovered readily from the zirconium subhalides or metal because of its comparatively greater volatility.

In a more particular embodiment of the invention, the preferential reduction of the zirconium tetrahalide is carried out in the presence of finely divided zirconium sponge as the reducing agent. As shown in illustrative examples set forth below, the use of finely divided zirconium sponge results in the recovery of hafnium-rich fractions which have a very high hafnium content. Though the exact mechanism is not now fully understood, it is believed that the mixed hafnium and zirconium tetrahalide feed is adsorbed on the finely divided zirconium sponge, or on the zirconium trihalide formed by the initial reaction of the zirconium tetrahalide and the zirconium. During the subsequent reduction of the adsorbed zirconium tetrahalide the unreduced hafnium tetrahalide is set free. When the zirconium tetrahalide is reduced primarily to the involatile zirconium trihalide, the latter may be disproportionated by heating to a temperature within the range of about 350° to 650° C., preferably about 400° to 460° C., according to the left-to-right direction of the following reversible reaction:

$$2ZrHal_3 \rightleftharpoons ZrHal_2 + ZrHal_4$$

The gaseous zirconium tetrahalide may then be recovered as a hafnium-free product, as more specifically set forth in Serial No. 360,320, now U.S. Patent No. 2,791,485. The relatively involatile zirconium dihalide may, on the other hand, be employed to selectively reduce fresh batches of the mixed hafnium and zirconium tetrahalide feed.

The zirconium metal sponge useful in the process of this invention may be prepared by any of the well known processes. For example, zirconium sponge prepared in accordance with the Kroll process may be employed. In the more specific embodiments of this invention, the zirconium metal sponge used was obtained by the recently proposed process which comprises reacting zirconium tetrahalide, e.g. the tetrachloride, with sodium to produce the subhalides of zirconium. The amount of sodium employed is about 20 to 90% by weight of the amount required for stoichiometric reductcion to the metal. The reduction reaction is carried out at a temperature above the melting point of sodium but below the melting point of the reaction mixture, e.g. about 150° C. up to about 400° C. and in a dry, solid, finely divided reaction medium comprising a mixture of the zirconium subhalide reduction product and sodium chloride. The zirconium subhalides are then reacted with sodium, in an amount stoichiometrically sufficient to complete the reduction, in a sintering vessel at a temperature of about 900° to 950° C. The resulting zirconium metal sponge is next separated from the molten sodium halide by-product, and the sponge may be water or acid leached to remove residual sodium chloride, if desired. It will be understood, however, that the particular method of manufacturing the zirconium metal sponge is not a feature of the present invention.

As previously noted, the selective reduction of the zirconium tetrahalide is carried out until zirconium trihalide, zirconium dihalide or zirconium metal is produced, while the hafnium tetrahalide remains substantially unreduced. The reduction is preferably carried out in vacuo or under an inert atmosphere using conventional inert gases such as argon. In general, the reduction will be carried out at a temperature sufficient to reduce the zirconium tetrahalide to subhalides or to the metal and at which the hafnium tetrahalide remains substantially unreduced. Temperatures within the range of about 250° to 500° C., preferably about 350° to 420° C., have been found to be particularly effective for hafnium tetrahalide purification and concentration. The mixed hafnium and zirconium feed may be employed either in vapor or liquid state, though the former is preferred. The amount of reducing agent utilized may vary greatly, depending in part on the amount of zirconium tetrahalide in the feed material and the degree of purification and concentration desired. However, the reducing agent will generally be employed in amounts sufficient to reduce substantially all of the zirconium tetrahalide. It will be understood, of course, that the present invention also encompasses features such as recycling the hafnium-rich fraction to the reducing zone or the use of successive reduction zones to ensure high purity and concentration. It also makes possible the purification of hafnium tetrahalide containing only residual quantities of zirconium tetrahalide. Generally, the type of treatment employed will depend both on the feed utilized and the product quality desired.

The unreduced hafnium tetrahalide may be separated from the reduced zirconium tetrahalide by any known means. The hafnium tetrahalide may be recovered, for example, by applying vacuum to the reducing zone or by purging the reducing zone with an inert gas such as argon. These methods have the added advantage of recovering any unreduced tetrahalides which may have become adsorbed on the reduced zirconium tetrahalide. The purging operation is usually carried out at an elevated temperature within the range of about 250° to 400° C. It is also within the scope of this invention to recover the unreduced hafnium tetrahalide by sublimation in vacuo. The reduced zirconium tetrahalide may also be recovered by conventional means, but its recovery does not constitute a feature of this invention.

The hafnium-rich fraction recovered in accordance with the process of this invention may be advantageously employed in the production of hafnium metal. Known methods for reducing the hafnium tetrahalide such as with magnesium may be used for hafnium metal sponge production. It should also be understood that the hafnium tetrachloride product of the instant process may be further purified by well established techniques, e.g. sublimation, prior to being reduced to the metal sponge.

Though the preferred feed material for the inventive process is the mixed hafnium and zirconium tetrachlorides, other tetrahalides such as tetraiodides and tetrabromides may also be employed. In this respect, the following examples utilizing mixed hafnium and zirconium tetrachloride feeds are presented for a more complete understanding without intention to have the invention limited to the details set forth therein.

Example I 16.5 grams of mixed zirconium and hafnium tetrachloride feed, containing 2.2% hafnium based on the total weight of the hafnium and zirconium, was sublimed in vacuo into a glass bulb of 50 ml. capacity containing 17 grams of zirconium sponge (about 60 mesh size). The bulb was then evacuated, sealed and heated at 350° C. for one hour. At this point, the bulb was cooled, and an extension arm sealed on the bulb. The bulb was then heated to 185° C. and 0.11 gram of tetrachlorides, containing 69% hafnium based on the hafnium and zirconium content, was recovered in the extension. Another fraction was next recovered at a temperature range of about 185° to 370° C. This fraction weighed 9 grams and constituted unreduced tetrachloride containing 2.2% hafnium based on the total hafnium and zirconium content.

Example II

Using the procedure of Example I, 5 grams of a hafnium tetrachloride-rich feed, containing 2% zirconium based on the total hafnium and zirconium content, was reacted with 9 grams of zirconium sponge at 300° C. for 30 minutes. Following reduction a hafnium tetrachloride fraction collected at about 350° C. and weighing 4.5 grams was found to contain only 0.5% zirconium based on total hafnium and zirconium.

The zirconium sponge employed in the above examples was prepared by the reduction of zirconium tetrachloride with sodium, as described above. For purposes of this invention, the zirconium sponge is employed in finely divided form, e.g. less than about 10 mesh.

It will be understood that the reactants and the operating conditions set forth in the illustrative examples may be varied within the limits indicated in the more general description of the invention.

What is claimed is:

1. A method of purifying hafnium tetrahalide which comprises reacting a mixture of hafnium and zirconium tetrahalides selected from the group consisting of tetrachlorides, tetrabromides, and tetraiodides with finely divided zirconium sponge at a temperature within the range of about 250° to 500° C. to selectively reduce the zirconium tetrahalide to involatile lower halides, while the hafnium tetrahalide remains unchanged, and then separating the unchanged volatile hafnium tetrahalide from the reduced zirconium tetrahalide product.

2. The method of claim 1 wherein said tetrahalides are tetrachlorides.

3. The method of claim 1 wherein said tetrahalides are tetrabromides.

4. The method of claim 1 wherein said tetrahalides are tetraiodides.

5. A method of purifying hafnium tetrahalide which comprises reacting a mixture of hafnium and zirconium tetrahalides selected from the group consisting of tetrachlorides, tetrabromides, and tetraiodides with finely divided zirconium metal sponge at a temperature within the range of about 250° C. to 500° C. to selectively reduce the zirconium tetrahalide to involatile zirconium trihalide, and then separately recovering unreduced volatile hafnium tetrahalide from said reaction mixture.

6. The process of claim 5 wherein said tetrahalides are tetrachlorides.

7. The process of claim 5 wherein said finely divided zirconium metal sponge has a mesh size of less than about 10.

References Cited in the file of this patent

UNITED STATES PATENTS

| | | |
|---|---|---|
| 2,670,270 | Jordan | Feb. 23, 1954 |
| 2,791,485 | Newnham | May 7, 1957 |
| 2,864,749 | Slatin | Dec. 16, 1958 |

OTHER REFERENCES

Mellor: "Comprehensive Treatise on Inorganic and Theoretical Chemistry," vol. 7, 1927, page 143.